United States Patent

Murata et al.

(10) Patent No.: US 9,611,910 B2
(45) Date of Patent: Apr. 4, 2017

(54) BRAKE TEMPERATURE DETECTION DEVICE AND ELECTRIC PARKING BRAKE CONTROL DEVICE

(71) Applicants: ADVICS CO., LTD., Kariya (JP); TOYOTA JIDOSHA KABUSHIKI KAISHA, Toyota-shi (JP)

(72) Inventors: Shunsuke Murata, Ama-gun (JP); Masatoshi Hanzawa, Kariya (JP); Takahiro Shiraki, Toyota (JP)

(73) Assignees: ADVICS CO., LTD., Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 24 days.

(21) Appl. No.: 14/337,758

(22) Filed: Jul. 22, 2014

(65) Prior Publication Data

US 2015/0027823 A1 Jan. 29, 2015

(30) Foreign Application Priority Data

Jul. 23, 2013 (JP) .................................. 2013-152773

(51) Int. Cl.
*B60T 8/17* (2006.01)
*F16D 66/00* (2006.01)
(Continued)

(52) U.S. Cl.
CPC ................ *F16D 66/00* (2013.01); *B60T 7/12* (2013.01); *B60T 8/885* (2013.01); *B60T 17/22* (2013.01);
(Continued)

(58) Field of Classification Search
CPC ...... B60T 2201/04; B60T 8/171; B60T 8/172; B60T 17/22; B60T 17/221; F16D 2066/001; F16D 2066/006; F16D 66/00
See application file for complete search history.

(56) References Cited

U.S. PATENT DOCUMENTS 5,136,508 A * 8/1992 Bannon ................... B60T 8/175
188/106 P
6,254,203 B1 * 7/2001 Arnold .................... B60T 8/171
188/1.11 R
(Continued)

FOREIGN PATENT DOCUMENTS

JP 2001-122107 A 5/2001
JP 2005-119343 A 5/2005
(Continued)

OTHER PUBLICATIONS

Official Action issued Jul. 28, 2015, by the Japan Patent Office, in corresponding Japanese Patent Application No. 2013-152773 with English translation of Official Action(5 pages).

*Primary Examiner* — Bradley King
*Assistant Examiner* — Stephen Bowes
(74) *Attorney, Agent, or Firm* — Buchanan Ingersoll & Rooney PC (57) ABSTRACT

A brake temperature detection device: acquires a kinetic-energy based temperature rise, which is an increase in an amount of brake heat that occurs when kinetic energy generated in a running vehicle is converted into thermal energy by braking; acquires a braking-energy based temperature rise, which is an increase in an amount of brake heat that is calculated from an amount of work done when a brake's friction material is pressed against a friction target material; determines state of slope of a road surface on which the vehicle is running; and detects a brake temperature in accordance with an increase in an amount of brake (Continued)

heat generated in braking. The brake temperature detection device selects, based on the state of slope, either the kinetic-energy based temperature rise or the braking-energy based temperature rise as the increase in the amount of brake heat generated in braking and achieves brake temperature detection.

4 Claims, 7 Drawing Sheets

(51) Int. Cl.
*F16D 65/14* (2006.01)
*B60T 7/12* (2006.01)
*B60T 17/22* (2006.01)
*B60T 8/88* (2006.01)
*G01L 5/28* (2006.01)

(52) U.S. Cl.
CPC .......... *F16D 65/14* (2013.01); *B60T 2201/04* (2013.01); *B60T 2270/406* (2013.01); *F16D 2066/001* (2013.01); *F16D 2066/003* (2013.01); *F16D 2066/006* (2013.01); *G01L 5/28* (2013.01)

(56) References Cited

U.S. PATENT DOCUMENTS

| 6,382,741 | B1* | 5/2002 | McCann | B60T 1/005 188/265 |
|---|---|---|---|---|
| 2004/0113486 | A1 | 6/2004 | Koga et al. | |
| 2005/0077783 | A1 | 4/2005 | Suzuki et al. | |
| 2007/0176489 | A1 | 8/2007 | Matsuura et al. | |
| 2009/0197738 | A1* | 8/2009 | Jackson | B60T 7/122 477/188 |
| 2012/0089313 | A1* | 4/2012 | Frashure | B60T 7/042 701/94 |

FOREIGN PATENT DOCUMENTS

| JP | 2009-226964 A | 10/2009 |
|---|---|---|
| JP | 2009-274519 A | 11/2009 |
| JP | 2012-192874 A | 10/2012 |

* cited by examiner

BRAKE TEMPERATURE DETECTION DEVICE AND ELECTRIC PARKING BRAKE CONTROL DEVICE

CROSS REFERENCE TO RELATED APPLICATION

This application is based on and incorporates herein by reference Japanese patent applications No. 2013-452773 filed on Jul. 23, 2013.

TECHNICAL FIELD

The present invention relates to a brake temperature detection device capable of accurately detecting a brake temperature and to an electric parking brake control device for controlling an electric parking brake (hereinafter referred to as the EPB) in accordance with the brake temperature.

BACKGROUND ART

Conventionally, a brake fade warning generation device for exercising control in accordance with a brake temperature was proposed in PTL 1. The device calculates an amount of brake heat that corresponds to a brake temperature, and issues a brake fade warning in accordance with the calculated amount of brake heat to warn that brake fade has occurred. The device issues a brake fade warning in accordance with a deceleration calculated from the amount of brake heat and the speed of a vehicle. More specifically, relationship between kinetic energy of a running vehicle and a amount of heat to be generated when the kinetic energy is converted into thermal energy by braking is predetermined, and then the amount of brake heat is determined by converting the kinetic energy of the vehicle into the amount of the brake heat based on the relationship of heat. If the calculated amount of brake heat is not smaller than a fade heat amount that causes brake fade, it is determined that brake fade has occurred. Further, if the deceleration of the vehicle (hereinafter simply referred to as the deceleration), which is calculated from the vehicle speed, is lower than an expected value calculated from a master cylinder (hereinafter referred to as the M/C) pressure at a time of braking, the brake fade warning is issued because it is determined that an inadequate braking effect is produced.

SUMMARY OF THE INVENTION

However, although the amount of brake heat is compared against the amount of fade heat to determine whether fade has occurred, an error may occur in the calculation of the amount of brake heat. Thus, a conclusion may be made in accordance with an erroneous amount of brake heat that fade has occurred. This may lead to the issuance of a wrong fade warning. Further, an inadequate braking effect is detected in accordance with the deceleration. However, when the vehicle is traveling in the direction of downhill, gravitational acceleration is added to the deceleration. Therefore, it may be determined the deceleration is lower than the expected value. Hence, if it is determined in accordance with an erroneous amount of brake heat that fade has occurred, the fade warning is issued when the deceleration is lower than the expected value. Consequently, it is important that the amount of brake heat be calculated with increased accuracy. In other words, it is essential that the brake temperature be detected with increased accuracy.

In light of the foregoing, it is an object of the present invention to provide a brake temperature detection device capable of detecting the brake temperature with increased accuracy and an EPB control device capable of controlling the EPB in accordance with an accurate brake temperature.

Solution to Problem

In order to achieve the above-described object, according to a first aspect of the present invention, there is provided a brake temperature detection device including: a first acquisition means that acquires a kinetic-energy based temperature rise, which is an increase in an amount of brake heat that occurs when kinetic energy generated in a running vehicle is converted into thermal energy by braking; a second acquisition means that acquires a braking-energy based temperature rise, which is an increase in an amount of brake heat that is calculated from an amount of work done when a brake's friction material is pressed against a friction target material; a hill determination means that determines state of slope of a road surface on which the vehicle is running; and a temperature detection means that detects a brake temperature in accordance with an increase in an amount of brake heat generated in braking; wherein, in accordance with the result of determination made by the hill determination means, the temperature detection means selects either the kinetic-energy based temperature rise or the braking-energy based temperature rise as the increase in the amount of brake heat generated in braking and achieves brake temperature detection.

As described above, the kinetic-energy based temperature rise and the braking-energy based temperature rise are both computed to select an optimal one of them in accordance with the form of the slope. Consequently, a computed brake temperature can be brought closer to an actual brake temperature.

According to a second aspect of the present invention, there is provided the brake temperature detection device as described in the first aspect, wherein the temperature detection means achieves the brake temperature detection by selecting the kinetic-energy based temperature rise when the hill determination means determines that the road surface on which the vehicle is running is a flat road surface, and by selecting the braking-energy based temperature rise when the hill determination means determines that the road surface on which the vehicle is running is a sloped road surface.

As described above, when the hill determination means determines that the vehicle is running on a flat road surface, the kinetic-energy based temperature rise is substantially the same as an actual increase in the amount of brake heat. Therefore, the kinetic-energy based temperature rise should be used as the increase in the amount of brake heat generated in braking. When the hill determination means determines that the vehicle is running on a sloped road surface, influence is exercised by a gravitational acceleration component. Therefore, brake temperature detection can be achieved by selecting the braking-energy based temperature rise.

According to a third aspect of the present invention, there is provided the brake temperature detection device as described in the first aspect, wherein the temperature detection means selects the kinetic-energy based temperature rise when the hill determination means determines that the road surface on which the vehicle is running is a flat road surface, and sets an upper-limit guard by selecting the kinetic-energy based temperature rise or the braking-energy based temperature rise, whichever is smaller, when the hill determination means determines that the road surface on which the vehicle is running is an upwardly-sloped road surface.

When the vehicle is running an upwardly-sloped road surface, influence is exercised by gravitational acceleration so that changes in the speed of the vehicle are not purely caused by conversion to the amount of brake heat. Hence, the influence of the gravitational acceleration is included in kinetic energy changes computed from the speed and weight of the vehicle. Thus, the value of the kinetic-energy based temperature rise is a value obtained by adding the influence of gravitational acceleration to the result of conversion to the amount of brake heat. Therefore, the value of the kinetic-energy based temperature rise may be greater than the result of conversion to the actual amount of brake heat. Consequently, if the kinetic-energy based temperature rise is greater than the braking-energy based temperature rise when the vehicle is running on an upwardly-sloped road surface, the upper-limit guard is set by using the value of the braking-energy based temperature rise because the value of the kinetic-energy based temperature rise is inaccurate. In other words, the kinetic-energy based temperature rise or the braking-energy based temperature rise, whichever is smaller, is used as the increase in the amount of brake heat generated in braking in order to avoid the use of the kinetic-energy based temperature rise, which is computed to be greater than its actual value.

According to a fourth aspect of the present invention, there is provided the brake temperature detection device as described in the first aspect, wherein the temperature detection means selects the kinetic-energy based temperature rise when the hill determination means determines that the vehicle is running on a flat road surface, and sets a lower-limit guard by selecting the kinetic-energy based temperature rise or the braking-energy based temperature rise, whichever is greater, when the hill determination means determines that the vehicle is running on a downwardly-sloped road surface.

When the vehicle is running a downwardly-sloped road surface, influence is also exercised by gravitational acceleration so that changes in the speed of the vehicle are not purely caused by conversion to the amount of brake heat. Hence, the influence of the gravitational acceleration is included in kinetic energy changes computed from the speed and weight of the vehicle. Thus, the value of the kinetic-energy based temperature rise is a value obtained by subtracting the influence of gravitational acceleration from the result of conversion to the amount of brake heat. Therefore, the value of the kinetic-energy based temperature rise may be smaller than the result of conversion to the actual amount of brake heat. Consequently, if the kinetic-energy based temperature rise is smaller than the braking-energy based temperature rise when the vehicle is running on a downwardly-sloped road surface, the lower-limit guard is set by using the value of the braking-energy based temperature rise because the value of the kinetic-energy based temperature rise is inaccurate. In other words, the kinetic-energy based temperature rise or the braking-energy based temperature rise, whichever is smaller, is used as the increase in the amount of brake heat generated in braking in order to avoid the use of the kinetic-energy based temperature rise, which is computed to be smaller than its actual value.

According to a fifth aspect of the present invention, there is provided the brake temperature detection device as described in the first aspect, wherein the temperature detection means computes the increase in the amount of brake heat generated in braking by performing a weighted computation which uses the kinetic-energy based temperature rise and the braking-energy based temperature rise in accordance with the gradient of the sloped road surface that is detected by the hill determination means.

As described above, the increase in the amount of brake heat generated in braking can be set by performing weighting in accordance with the gradient of a sloped road surface. This makes it possible to set an accurate increase in the amount of brake heat generated in braking in accordance with the gradient of a sloped road surface.

According to a sixth aspect of the present invention, there is provided an electric parking brake control device for controlling an electric parking brake that drives a motor to generate a pressing force for pressing a friction material against a friction target material and generates a braking force by causing friction between the friction material and the friction target material, the electric parking brake control device including: a lock control means that executes lock control by driving a motor to generate the pressing force and let the electric parking brake generate a braking force, stopping the drive of the motor when the braking force reaches a target braking force, and maintaining the braking force to achieve a locked state; wherein the lock control means sets a timing of ending the lock control in accordance with the brake temperature detected by the brake temperature detection device according to first aspect.

As described above, the control timing of lock control or the control count of lock control is set in accordance with a computed brake temperature. Therefore, even if heat slack occurs, it is possible to generate a desired braking force that is adequate for keeping the vehicle parked.

DESCRIPTION OF EMBODIMENTS

Embodiments of the present invention will now be described with reference to the accompanying drawings. In the following description of the embodiments, elements identical or equivalent to each other are designated by the same reference numerals.

First Embodiment

Figure 1:
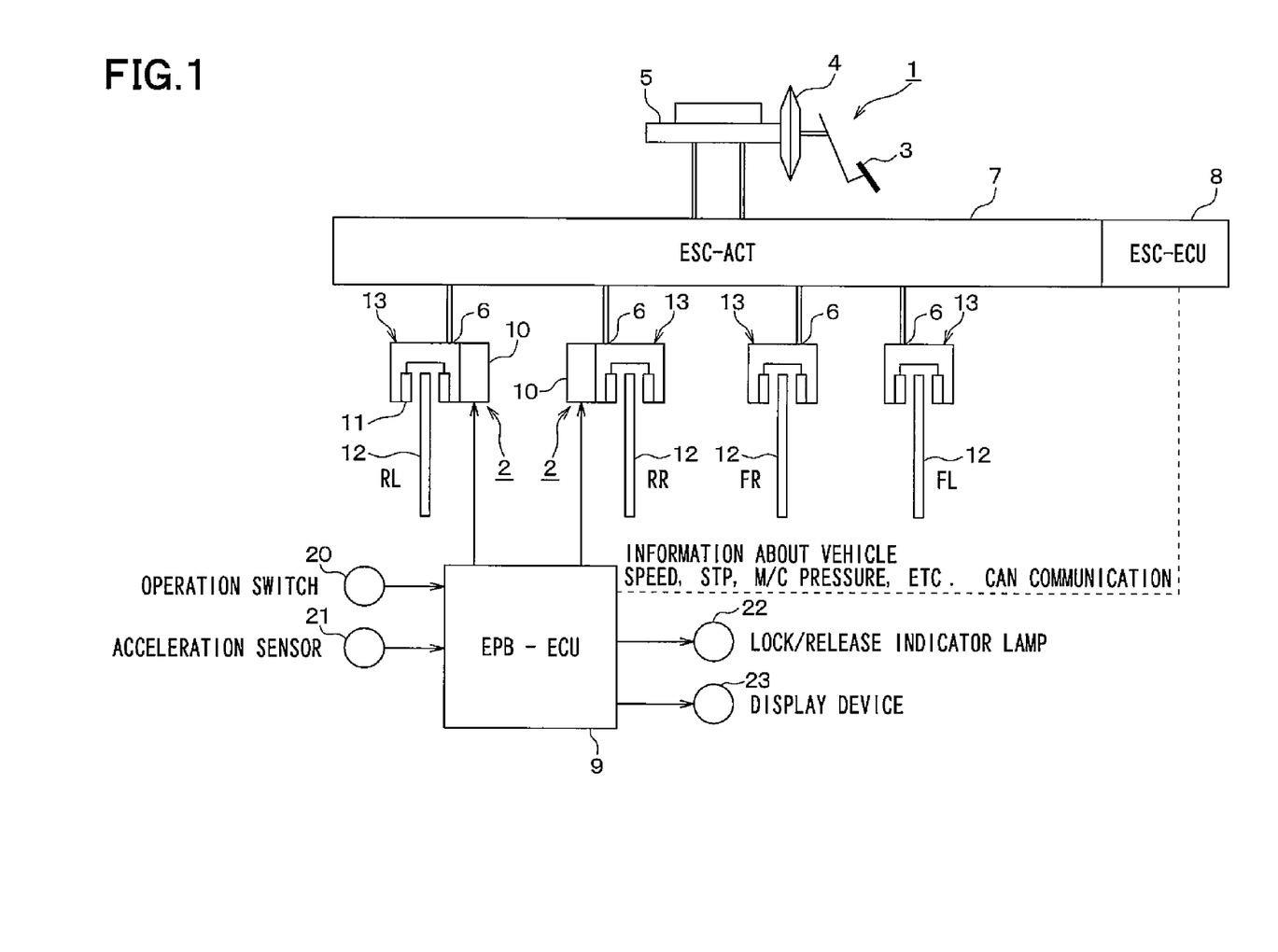
FIG. 1 is a schematic diagram illustrating an overview of a vehicle brake system to which an EPB control device according to a first embodiment of the present invention is applied.

A first embodiment of the present invention will now be described. In the description of the first embodiment, a vehicle brake system in which a disc brake type EPB is adopted for a rear wheel system will be explained as an example. FIG. 1 is a schematic diagram illustrating an overview of the vehicle brake system to which an EPB control device according to the present embodiment is applied. The following description will be given with reference to FIG. 1.

As shown in FIG. 1, the vehicle brake system includes a service brake 1 and an EPB 2. The service brake 1 generates a braking force in accordance with a brake pedal force applied by a driver. The EPB 2 locks the wheels of a vehicle to prevent the vehicle from moving while the vehicle is parked.

The service brake 1 generates a braking force by causing a brake booster 4 to boost the brake pedal force applied by the driver when the driver steps on a brake pedal 3, generating a brake fluid pressure within a master cylinder (M/C) 5 in accordance with the boosted brake pedal force, and transmitting the brake fluid pressure to a wheel cylinder (hereinafter referred to as the W/C) 6 included in a brake mechanism for each wheel. An actuator 7 for adjusting the brake fluid pressure is disposed between the M/C 5 and the W/C 6. The actuator 7 is structured to be able to adjust the braking force generated by the service brake 1 and perform various control functions (such as an ABS control function) for the purpose of enhancing the safety of the vehicle.

Various control functions provided by the actuator 7 are executed by an ESC (Electronic Stability Control)-ECU 8. For example, the ESC-ECU 8 controls a brake fluid pressure circuit included in the actuator 7 and controls a W/C pressure by outputting a control current for controlling various control valves and a pump drive motor, which are included in the actuator 7. When, for instance, normal braking is applied, the actuator 7 transmits an M/C pressure generated in the M/C 5 to the W/C 6 as is. However, when, for instance, ABS control is exercised, the actuator 7 controls the on/off of various control valves and controls the pump drive motor to increase or decrease the W/C pressure, thereby preventing the wheels from being locked. Further, the actuator 7 can automatically apply the W/C pressure by driving the various control valves and the pump drive motor. When the M/C pressure is not generated or when a WIC pressure higher than the M/C pressure is to be generated, the actuator 7 can generate a high braking force in accordance with an automatic pressurization function. The structure of the actuator 7 has been well known and will not be described in detail. However, the actuator 7 includes, for example, various control valves, various pumps, and a pump drive motor.

Meanwhile, the EPB 2 is controlled by the EPB control device (hereinafter referred to as the EPB-ECU) 9. The EPB-ECU 9 drives a motor 10 to control the brake mechanism, thereby generating a braking force.

The EPB-ECU 9 includes a well-known microcomputer having, for example, a CPU, a ROM, a RAM, and an I/O device. In accordance with a program stored, for instance, in the ROM, the EPB-ECU 9 controls the rotation of the motor 10 to provide parking brake control, such as lock control and release control. In an occasion of the lock control, the motor 10 is driven to generate a pressing force that presses a brake pad 11 against a brake disc 12. This causes the EPB 2 to generate a braking force. When the braking force reaches a target braking force, the drive of the motor 10 is stopped so that the braking force is maintained to achieve and keep a locked state. In an occasion of the release control, the motor 10 is driven in a direction opposite to the direction in which the motor 10 is driven to exercise lock control. This releases the pressing force that presses the brake pad 11 against the brake disc 12. When the brake pad 11 is separated a predetermined distance from the brake disc 12, the drive of the motor 10 is stopped to achieve a released state.

The EPB-ECU 9 and the ESC-ECU 8 exchange information with each other through a CAN communication link, which provides an in-vehicle LAN. When exercising parking brake control, the EPB-ECU 9 acquires, for example, vehicle speed information handled by the ESC-ECU 8, STP information indicative of the status of a stop lamp switch (hereinafter referred to as the STP), and M/C pressure information. The ESC-ECU 8 acquires detection signals from a wheel speed sensor (not shown), the STP, and an M/C pressure sensor and acquires the vehicle speed information, the STP information, and the M/C pressure information in accordance with the detection signals. Hence, these pieces of information are conveyed to the EPB-ECU 9 through the CAN communication link.

Further, the EPB-ECU 9 inputs, for example, a signal indicative of the operating state of an operation switch (SW) 20 mounted on an instrument panel (not shown) in a vehicle compartment and a detection signal of an acceleration sensor 21 for detecting the longitudinal acceleration of the vehicle, and drives the motor 10 in accordance, for instance, with the operating state of the operation switch (SW) 20 and with the longitudinal acceleration of the vehicle. Furthermore, the EPB-ECU 9 outputs a signal indicative of the locked state or the released state to a lock/release indicator lamp 22 mounted on the instrument panel. When a failure of the EPB 2 is detected or a fade warning is generated, the EPB-ECU 9 outputs a signal indicative of such a condition to a display device 23.

More specifically, the EPB-ECU 9 includes various functional sections for performing parking brake control functions such as a motor current detection function of detecting a motor current (a current flowing in the motor 10) either upstream or downstream of the motor 10, a target motor current computation function of computing a target motor current (target current value) for terminating the lock control, a function of determining whether the motor current has reached the target motor current, and a function of controlling the EPB 2 in accordance with the operating state of the operation switch (SW) 20. The EPB-ECU 9 controls the EPB 2 by rotating the motor 10 in a normal direction or in a reverse direction or stopping the rotation of the motor 10 in accordance with the status of the operation switch (SW) 20 and with the motor current.

The brake mechanism provided for each wheel is a mechanical structure for generating a braking force in the vehicle brake system according to the present embodiment. The brake mechanism for a front wheel system is structured to generate a braking force when the service brake 1 is operated. However, the brake mechanism for the rear wheel system is commonly structured to generate a braking force when either the service brake 1 or the EPB 2 is operated. Unlike the brake mechanism for the rear wheel system, the brake mechanism for the front wheel system is a brake mechanism that has been generally used since the elimination of a mechanism for generating a braking force in accordance with the operation of the EPB 2.

The brake mechanism for the front wheel system, which generates a braking force in accordance with the operation of the service brake 1, has been generally used. The brake mechanism for the rear wheel system, which generates a braking force in accordance with the operations of the service brake 1 and the EPB 2, is also made well known, for instance, by Japanese Unexamined Patent Application Publication No. JP-A-2010-58536. Therefore, the structures of these brake mechanisms will not be described in detail here.

Parking brake control, which the EPB-ECU 9 provides by using the vehicle brake system configured as described above and by using the various functional sections and the program stored in the built-in ROM (not shown), will now be described. However, a normal process for exercising lock control and release control, which is performed within a parking brake control process, is the same as a previously performed process. Therefore, a fade warning process based on brake temperature detection and a lock control method based on brake temperature detection, which are peculiar to the present invention, will be described below.

Figure 2:
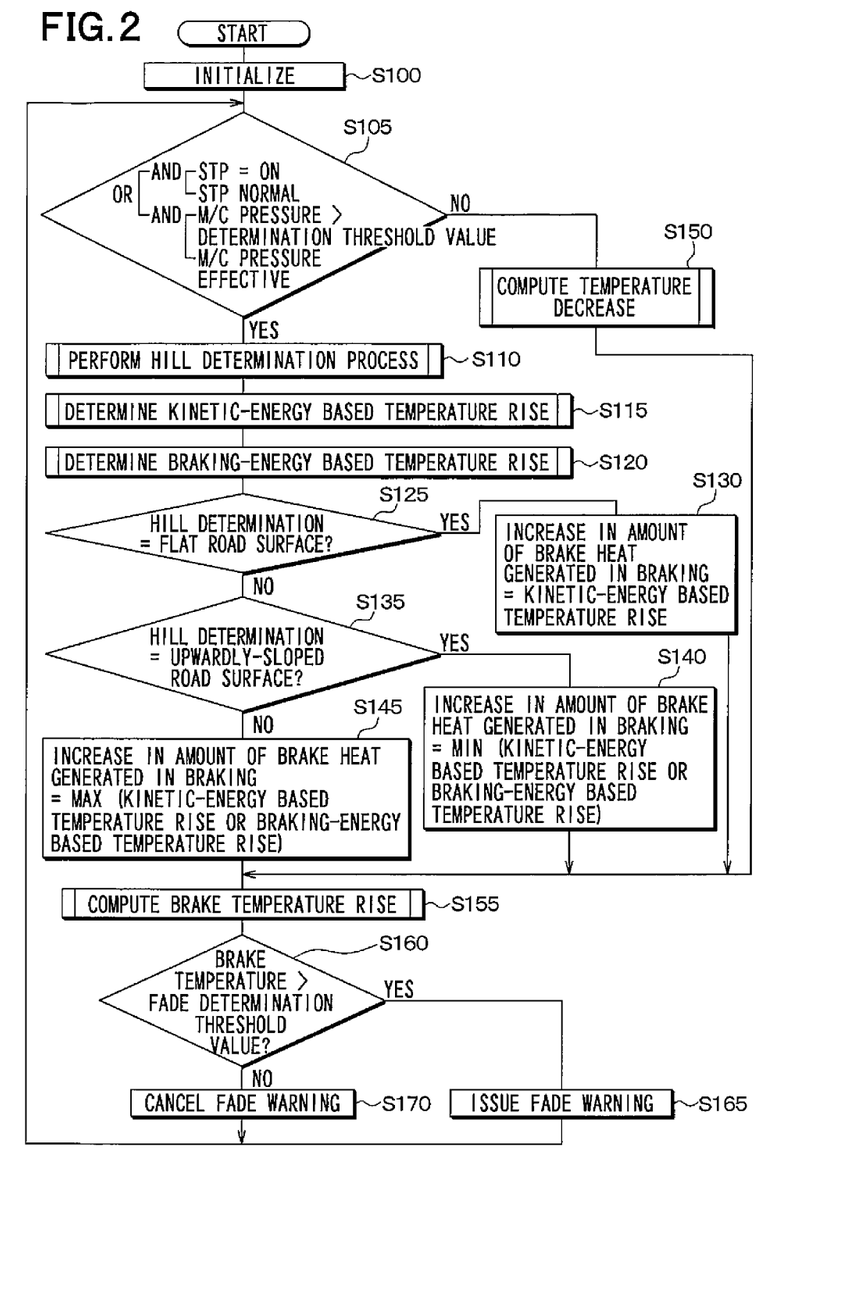
FIG. 2 is a flowchart illustrating in detail a fade warning process based on a brake temperature detection result.

FIG. 2 is a flowchart illustrating in detail the fade warning process based on the result of brake temperature detection. The fade warning process is performed during each predetermined control cycle while, for instance, an ignition switch (hereinafter referred to as the IG) is turned to activate the EPB-ECU 9.

In the fade warning process, the brake temperature is detected by calculating the amount of increase in the brake temperature, and a fade warning issued in accordance with the detected brake temperature. Further, as brake temperature detection is achieved in the fade warning process, the result of brake temperature detection is used to determine the pressing force for pressing the brake pad 11 against the brake disc 12 during lock control.

The amount of increase in the brake temperature represents the amount of increase in the temperature of the brake mechanism during each control cycle, or more specifically, the amount of increase in the temperature of the brake pad 11 during each control cycle. Thus, the total amount of temperature increase represents the amount of temperature increase since the execution of the fade warning process. Hence, the brake temperature is determined by adding an ambient temperature to the total amount of temperature increase.

Under normal conditions, it is assumed that the brake temperature at a time when the fade warning process is executed is equal to the ambient temperature. However, if an interval between the instant at which the IG was turned off and the instant at which it is turned back on is extremely short, the brake temperature may not be sufficiently decreased. In such an instance, the brake temperature may be higher than the ambient temperature. However, after the IG was turned off, an adequate period of time usually elapses to decrease the brake temperature. Even if the interval between the instant at which the IG was turned off and the instant at which it is turned back on is short, the brake temperature decreases while the vehicle is running. Therefore, it is fair to assume that the brake temperature at a time when the fade warning process is initiated is equal to the ambient temperature. In reality, the brake temperature is determined by adding the ambient temperature to the total amount of temperature increase. However, as the brake temperature is high when the fade warning is issued, the ambient temperature is ignorable. Consequently, it is assumed that the total amount of temperature increase substantially represents the brake temperature.

As shown in FIG. 2, first of all, in step 100, a normal initialization process is performed, for instance, to reset a flag and reset a stored value. Upon completion of step 100, processing proceeds to step 105. A braking determination process is performed in step 105 to determine whether braking is in progress. The present embodiment also determines whether sensors used for the braking determination process are normal. More specifically, step 105 is performed to (1) determine whether the STP is turned on and normal, (2) determine whether the M/C pressure is higher than a threshold value for assuming that the brake pedal 3 is depressed and whether the M/C pressure is effective, and determine whether at least one of conditions (1) and (2) is established. These determination sequences are performed in accordance with information that the EPB-ECU 9 has acquired from the ESC-ECU 8.

An alternative is to perform determination sequence (1) only or determination sequence (2) only. Another alternative is to complete step 105 without determining whether the STP is normal and whether the M/C pressure is effective. In the present embodiment, however, all the above-mentioned determination sequences are performed for the sake of redundancy.

Figure 3:
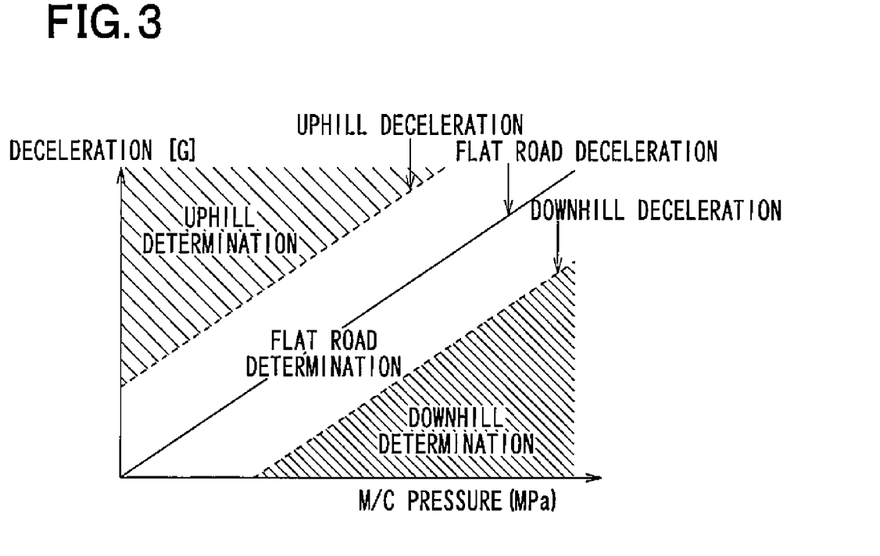
FIG. 3 is map illustrating the relationship between an M/C pressure and deceleration.

If the query in step 105 is answered "YES", processing proceeds to step 110. In step 110, a hill determination process is performed to determine state (for example, a degree of slope) of a road surface on which the vehicle is running. The hill determination process is performed to determine whether the road surface on which the vehicle is running is a flat road surface, a downwardly-sloped road surface, or an upwardly-sloped road surface. The hill determination process will now be described with reference to a map that is shown in FIG. 3 to indicate the relationship between the M/C pressure and deceleration.

The M/C pressure and the deceleration correlate with each other and are substantially proportional to each other. However, if the M/C pressure remains unchanged, the deceleration is lower due to gravitational acceleration when the vehicle is running on a downwardly-sloped road surface than when the vehicle is running on a flat road surface. Further, if the M/C pressure remains unchanged, the deceleration is higher due to gravitational acceleration when the vehicle is running on an upwardly-sloped road surface than when the vehicle is running on a flat road surface. Thus, the correlation between the M/C pressure and the deceleration changes so as to change the intercept of a linear function indicative of the correlation. In other words, the deceleration obtained when a predetermined M/C pressure is generated is downhill deceleration while the vehicle is running on a downwardly-sloped road surface or uphill deceleration while the vehicle is running on an upwardly-sloped road surface. Hence, the relationship between the M/C pressure and the deceleration is represented by the relationship between the M/C pressure and the downhill deceleration when the vehicle is running on a downwardly-sloped road surface and represented by the relationship between the M/C pressure and the uphill deceleration when the vehicle is running on an upwardly-sloped road surface.

As such being the case, in consideration of variation in the M/C pressure sensor and in the acceleration sensor 21, a dead zone is set around a linear function indicative of the relationship between the M/C pressure and deceleration prevailing when the vehicle is running on a flat road surface. A flat road determination process is performed within the dead zone. An uphill determination process is performed in a region that is outside of the dead zone and provides a high deceleration with respect to the same M/C pressure. A downhill determination process is performed in a region that is outside of the dead zone and provides a low deceleration with respect to the same M/C pressure. More specifically, the vehicle is determined to be running on a downwardly-sloped road surface when flat road deceleration is a reference deceleration and actual deceleration is lower than a value obtained by adding the downhill deceleration (negative value) to the reference deceleration corresponding to a generated M/C pressure. Further, the vehicle is determined to be running on an upwardly-sloped road surface when the actual deceleration is higher than a value obtained by adding the uphill deceleration (positive value) to the reference deceleration corresponding to the generated M/C pressure. Moreover, the vehicle is determined to be running on a flat road surface when the actual deceleration is between the value obtained by adding the downhill deceleration (negative value) to the reference deceleration and the value obtained by adding the uphill deceleration (positive value) to the reference deceleration. The hill determination process is completed in the above-described manner.

Next, processing proceeds to step 115. In step 115, a kinetic energy computation is performed to compute an increase in an amount of brake heat that is caused by kinetic energy. This amount of brake heat has a dimension of temperature. The increase in the amount of brake heat that is caused by kinetic energy is an increase in the amount of heat that is assumed to be generated on the brake when the kinetic energy generated in the vehicle is converted into a braking force. The increase in the amount of brake heat that is caused by kinetic energy will be hereinafter referred to as a kinetic-energy based temperature rise. For example, the relationship between kinetic energy generated in the vehicle and the amount of heat that is assumed to be generated when the kinetic energy is converted into the braking force is predetermined. The kinetic-energy based temperature rise is then determined by converting the vehicle's kinetic energy into the amount of heat. When the weight of the vehicle is m and the speed of the vehicle is v, the kinetic energy generated in the vehicle can be expressed as $\frac{1}{2} \times m v^2$. Therefore, the EPB-ECU 9 determines the kinetic energy by acquiring the vehicle speed information from the ESC-ECU 8 and derives the kinetic-energy based temperature rise corresponding to the determined kinetic energy from the predetermined relationship.

Next, processing proceeds to step 120. In step 120, a braking energy computation is performed to compute an increase in an amount of brake heat that is caused by energy produced by braking. This amount of brake heat has a dimension of temperature. The increase in the amount of brake heat that is caused by braking energy is an increase in the amount of heat that is possibly derived from energy produced when the vehicle is decelerated by braking, that is, an increase in the amount of heat that is calculated from the amount of work done when the brake pad 11, which is a friction material, is pressed against the brake disc 12, which is a friction target material. The increase in the amount of brake heat that is caused by the braking energy is hereinafter referred to as the braking-energy based temperature rise. For example, the relationship between the energy consumed by a braking force when the vehicle is decelerated by braking and the amount of heat possibly derived from that energy is predetermined. Further, the braking-energy based temperature rise is determined by converting the vehicle's braking energy into the amount of heat. The braking energy is the product of the W/C pressure, that is, the pressing force for pressing the brake pad 11 against the brake disc 12, and the number of wheel revolutions made during braking, that is, a braking distance. Therefore, the EPB-ECU 9 acquires the vehicle speed information from the ESC-ECU 8, determines the braking energy from the M/C pressure information, and derives the braking-energy based temperature rise corresponding to the determined braking energy from the predetermined relationship.

Next, processing proceeds to step 125. Step 125 is performed to determine whether the determination result produced by the hill determination process performed in step 110 indicates that the vehicle is running on a flat road surface.

When the increase in the amount of brake heat generated in braking is to be computed, either the aforementioned kinetic-energy based temperature rise or braking-energy based temperature rise may be used. The kinetic-energy based temperature rise is a value that is obtained by converting the kinetic energy, which is represented by the speed and weight of the vehicle, into the amount of brake heat. This value is basically accurate. The braking-energy based temperature rise is a value computed in accordance with the braking distance and the W/C pressure. However, the coefficient of friction between the brake pad 11 and the brake disc 12, which is included in an arithmetic expression, is likely to vary with the environment (for example, the ambient temperature and humidity). Hence, the braking-energy based temperature rise is not as accurate as the kinetic-energy based temperature rise.

Basically, the kinetic-energy based temperature is more accurate than the braking-energy based temperature rise as described above. It is therefore preferred that the kinetic-energy based temperature rise be used. However, the kinetic-energy based temperature rise is erroneous due to the influence of gravitational acceleration according to the gradient of a sloped road surface when the vehicle is running on a sloped road surface. In such a situation, the braking-energy based temperature rise may more accurately represent the increase in the amount of brake heat generated in braking than the kinetic-energy based temperature rise.

As such being the case, if the query in step 125 is answered "YES", processing proceeds to step 130. In step 130, the kinetic-energy based temperature rise is selected as an increase in the amount of brake heat generated in braking. The increase in the amount of brake heat generated in braking has a dimension of temperature. If, on the other hand, the query in step 125 is answered "NO", processing proceeds to step 135. Step 135 is performed to determine whether the determination result produced by the hill determination process indicates that the vehicle is running on an upwardly-sloped road surface. This makes it possible to select the kinetic-energy based temperature rise or the braking-energy based temperature rise, whichever is more appropriate, in accordance with the form of the slope.

More specifically, if the determination result produced by the hill determination process indicates that the vehicle is running on an upwardly-sloped road surface, processing proceeds to step 140. In step 140, the kinetic-energy based temperature rise or the braking-energy based temperature rise, whichever is smaller, is used as the increase in the amount of brake heat generated in braking. When the vehicle is running on an upwardly-sloped road surface, influence is exercised by gravitational acceleration so that changes in the speed of the vehicle are not purely caused by conversion to the amount of brake heat. Hence, the influence of the gravitational acceleration is included in kinetic energy changes computed from the speed and weight of the vehicle. Thus, the value of the kinetic-energy based temperature rise is a value obtained by adding the influence of gravitational acceleration to the result of conversion to the amount of brake heat. Therefore, the value of the kinetic-energy based temperature rise may be greater than the result of conversion to the actual amount of brake heat. Consequently, if the kinetic-energy based temperature rise is greater than the braking-energy based temperature rise when the vehicle is running on an upwardly-sloped road surface, an upper-limit guard is set by using the value of the braking-energy based temperature rise because the value of the kinetic-energy based temperature rise is determined to be inaccurate. In other words, the kinetic-energy based temperature rise or the braking-energy based temperature rise, whichever is smaller, is used as the increase in the amount of brake heat generated in braking in order to avoid the use of the kinetic-energy based temperature rise, which is computed to be greater than its actual value.

On the other hand, if the determination result produced by the hill determination process indicates that the vehicle is running on a downwardly-sloped road surface, processing proceeds to step 145. In step 145, the kinetic-energy based temperature rise or the braking-energy based temperature rise, whichever is greater, is used as the increase in the amount of brake heat generated in braking. When the vehicle is running on a downwardly-sloped road surface, influence is also exercised by gravitational acceleration so that changes in the speed of the vehicle are not purely caused by conversion to the amount of brake heat. Hence, the influence of the gravitational acceleration is included in kinetic energy changes computed from the speed and weight of the vehicle. Thus, the value of the kinetic-energy based temperature rise is a value obtained by subtracting the influence of gravitational acceleration from the result of conversion to the amount of brake heat. Therefore, the value of the kinetic-energy based temperature rise may be smaller than the result of conversion to the actual amount of brake heat. Consequently, if the kinetic-energy based temperature rise is smaller than the braking-energy based temperature rise when the vehicle is running on a downwardly-sloped road surface, a lower-limit guard is set by using the value of the braking-energy based temperature rise because the value of the kinetic-energy based temperature rise is determined to be inaccurate. In other words, the kinetic-energy based temperature rise or the braking-energy based temperature rise, whichever is greater, is used as the increase in the amount of brake heat generated in braking in order to avoid the use of the kinetic-energy based temperature rise, which is computed to be smaller than its actual value.

As described above, the increase in the amount of brake heat that is caused when the vehicle is decelerated by braking while it is running on a flat, upwardly-sloped, or downwardly-sloped road surface. Meanwhile, if the determination result produced in step 105 indicates that the vehicle is not under braking, processing proceeds to step 150. In step 150, a temperature decrease computation process is performed. When the vehicle is not under braking, the brake is cooled because no friction occurs between the brake pad 11 and the brake disc 12. A temperature decrease caused by cooling is computed in accordance with Newton's law of cooling, which states that the rate of cooling is proportional to the difference between the brake temperature and the ambient temperature. Here, the temperature decrease represents a decrease in the brake temperature that is caused during each computation cycle.

After the increase in the amount of brake heat generated in braking or the temperature decrease caused by cooling is computed, processing proceeds to step 155. In step 155, the amount of increase in the brake temperature is calculated. More specifically, if the vehicle is decelerated by braking, the increases in the amount of brake heat generated in braking, which are set in steps 130, 140, and 145 are added together to calculate the amount of increase in the brake temperature. If, on the other hand, the vehicle is not under braking, the temperature decrease is subtracted from the cumulative amount of increases in the brake temperature to calculate the amount of increase in the brake temperature that takes the result of cooling into account. This results in the calculation of the amount of increase in the brake temperature since the beginning of the fade warning process.

Next, processing proceeds to step 160. Step 160 is performed to determine whether a fade determination threshold value is exceeded by the brake temperature, that is, a value obtained by adding the amount of increase in the brake temperature to the ambient temperature. If the fade determination threshold value is exceeded, processing proceeds to step 165 and issues a fade warning. If, on the other hand, the fade determination threshold value is not exceeded, processing proceeds to step 170 and cancels the fade warning. In this manner, the fade warning process is completed.

Figure 4:
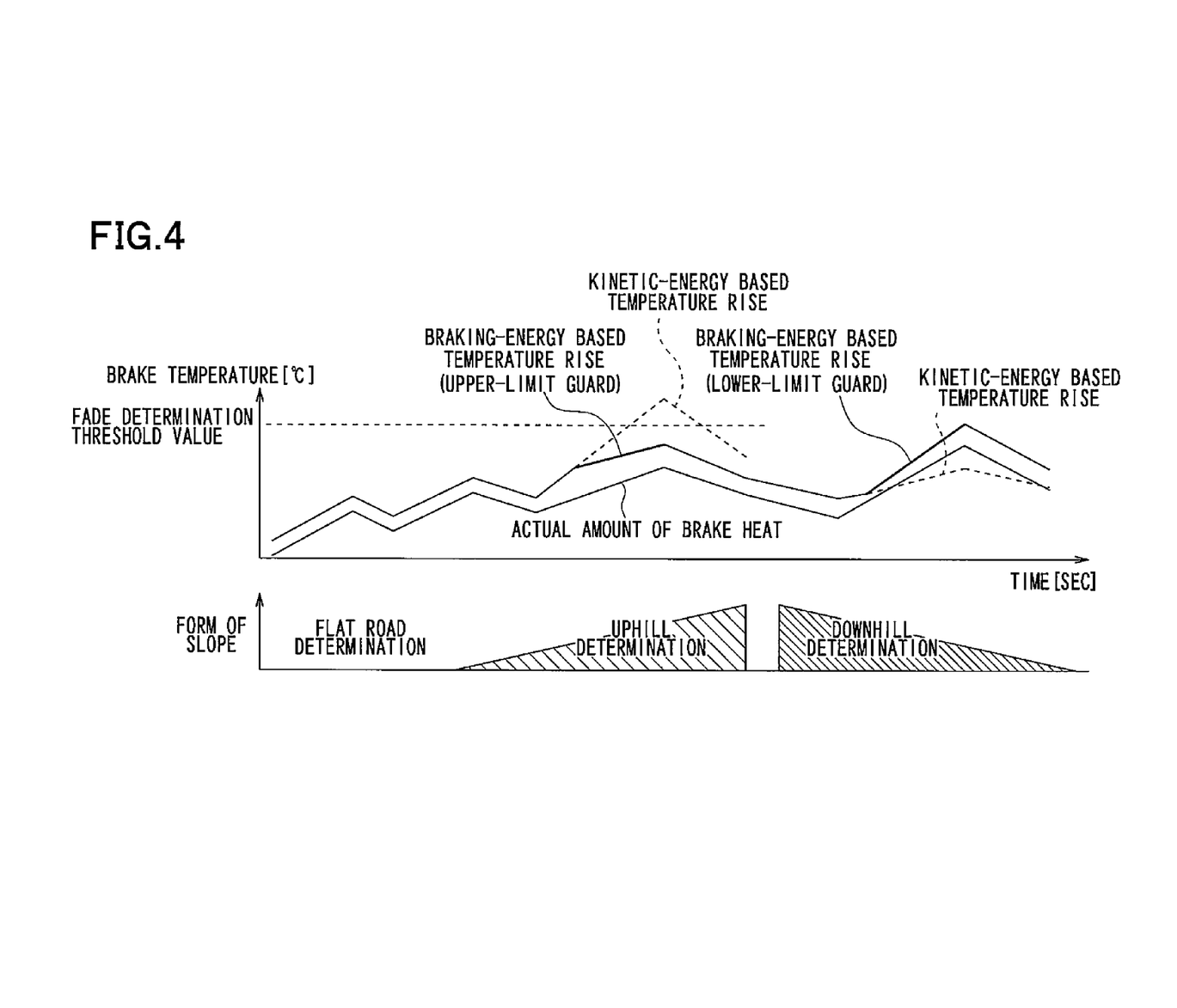
FIG. 4 is a timing diagram illustrating a kinetic-energy based temperature rise and a braking-energy based temperature rise, which are computed during the fade warning process, and the relationship between an actual brake temperature and a brake temperature computed from the kinetic-energy based temperature rise and the braking-energy based temperature rise.

FIG. 4 is a timing diagram illustrating the kinetic-energy based temperature rise and the braking-energy based temperature rise, which are computed during the fade warning process, and the relationship between an actual brake temperature and a brake temperature computed from the kinetic-energy based temperature rise and the braking-energy based temperature rise.

As shown in FIG. 4, while the vehicle is determined to be running on a flat road surface, the kinetic-energy based temperature rise is used as the increase in the amount of brake heat generated in braking. As the kinetic-energy based temperature rise is substantially the same as the actual increase in the amount of brake heat, the detected brake temperature is close to the actual brake temperature.

If the vehicle is subsequently running on an upwardly-sloped road surface, the kinetic-energy based temperature rise or the braking-energy based temperature rise, whichever is smaller, is used as the increase in the amount of brake heat generated in braking. For a certain period after the road surface is changed to an upwardly-sloped road surface, the kinetic-energy based temperature rise is basically used as the increase in the amount of brake heat generated in braking. However, when the influence of gravitational acceleration increases due to the upwardly-sloped road surface, thereby causing the kinetic-energy based temperature rise to exceed the braking-energy based temperature rise, the braking-energy based temperature rise is subsequently used as the increase in the amount of brake heat generated in braking. If the kinetic-energy based temperature rise should be continuously used as the increase in the amount of brake heat generated in braking, the brake temperature computed by using the kinetic-energy based temperature rise may exceed the fade determination threshold value as indicated by the broken line in FIG. 4. However, when the braking-energy based temperature rise is used as the increase in the amount of brake heat generated in braking, it is possible to avoid a situation where an erroneously computed brake temperature exceeds the fade determination threshold value, thereby issuing a fade warning.

If the vehicle is subsequently running on a downwardly-sloped road surface, the kinetic-energy based temperature rise or the braking-energy based temperature rise, whichever is greater, is used as the increase in the amount of brake heat generated in braking. For a certain period after the road surface is changed to a downwardly-sloped road surface, the kinetic-energy based temperature rise is basically used as the increase in the amount of brake heat generated in braking. However, when the influence of gravitational acceleration increases due to the downwardly-sloped road surface, thereby causing the kinetic-energy based temperature rise to decrease below the braking-energy based temperature rise, the braking-energy based temperature rise is subsequently used as the increase in the amount of brake heat generated in braking. If the kinetic-energy based temperature rise should be continuously used as the increase in the amount of brake heat generated in braking, the brake temperature computed by using the kinetic-energy based temperature rise decreases below the actual brake temperature as indicated by the broken line in FIG. 4. However, when the braking-energy based temperature rise is used as the increase in the amount of brake heat generated in braking, it is possible to create a situation where the computed brake temperature is closer to the actual brake temperature.

As described above, the kinetic-energy based temperature rise and the braking-energy based temperature rise are both computed in the fade warning process to select an optimal one of them in accordance with the form the slope. Consequently, a computed brake temperature can be brought closer to an actual brake temperature. Hence, it is possible to avoid a situation where an erroneously computed brake temperature exceeds the fade determination threshold value, thereby issuing a fade warning.

Further, lock control may be exercised over the EPB 2 in accordance with the brake temperature computed as described above. If the brake temperature is high when the EPB 2 is activated, the brake pad 11 thermally shrinks due to subsequent cooling. Heat slack then occurs in which the braking force generated by the EPB 2 is decreased. It is therefore possible to set timing of ending an occasion of the lock control and the number of occasions of the lock control in consideration of the heat slack. More specifically, it is possible to set timing of stopping the motor 10, a time interval between the end of a first occasion of the lock control and a timing at which the locked state is achieved again in the next occasion of the lock control, and the number of occasions of the lock control in each of which the locked state is achieved again.

When, for instance, the EPB-ECU 9 controls the EPB 2, the current flowing in the motor 10 corresponds to the load imposed on the motor 10. The load imposed on the motor 10 corresponds to the pressing force applied from the brake pad 11 to the brake disc 12. Therefore, the EPB-ECU 9 detects the motor current. When the motor current has reached a target motor current, a pressing force applied from the brake pad 11 to the brake disc 12 becomes a desired pressing value. Then, the EPB-ECU 9 determines that the braking force exerted by the EPB 2 has reached a target braking force and accordingly stops driving the motor 10. Consequently, a situation where a desired braking force is generated by the EPB 2 is maintained even when the vehicle is parked.

In the above instance, the target motor current is computed by a target motor current computation process. The target motor current computation process should be performed to compute the target motor current in consideration of the brake temperature. For example, when a coefficient (or a coefficient term corresponding to the brake temperature is defined and set so that the target motor current increases with an increase in the brake temperature, a desired braking force for sufficiently keeping the vehicle parked can be generated even if the brake pad 11 is cooled to a low temperature while the vehicle is parked.

Figure 7:
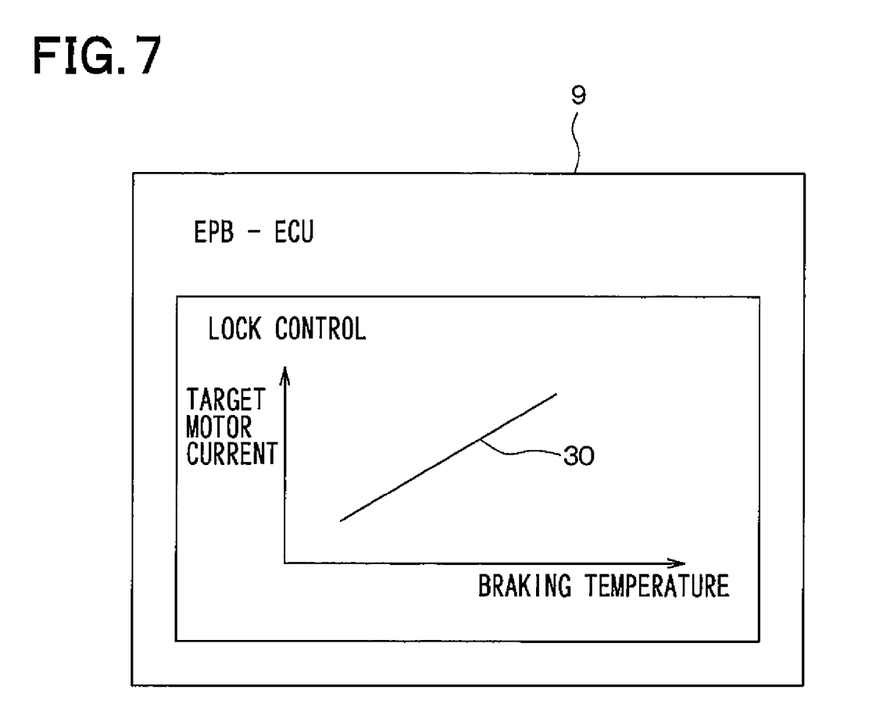
FIG. 7 is a diagram illustrating relation between a target motor current and a brake temperature in lock control performed by the EPB-ECU.

With this operation, relation between the target motor current and the brake temperature at the first occasion of the lock control after the vehicle is parked may be determined to be the line 30 in the graph of FIG. 7. The end timing of the lock control becomes later as the target motor current becomes larger.

Further, a desired braking force can also be generated by computing the time required for the EPB-ECU 9 to re-execute the lock control over the EPB 2 and the number of occasions in which the lock control over the EPB 2 is re-executed. While the vehicle is parked, a degree of heat slack varies depending on the brake temperature at the first occasion of the lock control. Therefore, the time required for re-executing the lock control and the number of occasions in which the lock control is re-executed should be computed in accordance with the brake temperature at the first occasion of execution of the lock control. For example, if the brake temperature is high when the lock control is performed at the first occasion while the vehicle is parked, the brake temperature is rapidly lowered because the brake temperature greatly differs from the atmospheric temperature. This increases the degree of heat slack. Therefore, a desired braking force can be generated by performing the lock control again after a shorter period of time passes subsequent to the first occasion of the lock control while the vehicle is parked, and by performing the lock control again after another certain period of time passes. If, on the other hand, the brake temperature is low when the lock control is performed at the first occasion, a desired braking force can be generated to keep the vehicle parked by performing the lock control again after a longer period of time passes subsequent to the first occasion of the lock control while the vehicle is parked.

Consequently, even if heat slack occurs, a desired braking force for keeping the vehicle parked can be generated by computing the brake temperature as described above, computing the target motor current for the lock control in accordance with the computed brake temperature, determining the end timing of the lock control in accordance with the target motor current, computing the time required for the resumption of the lock control and the number of occasions of the lock control in accordance with the brake temperature, and re-executing the lock control.

Second Embodiment

A second embodiment of the present invention will now be described. The second embodiment differs in the hill determination process from the first embodiment and is the same as the first embodiment in the other respects. Therefore, the following description deals with only the differences between the second embodiment and the first embodiment.

Figure 5:
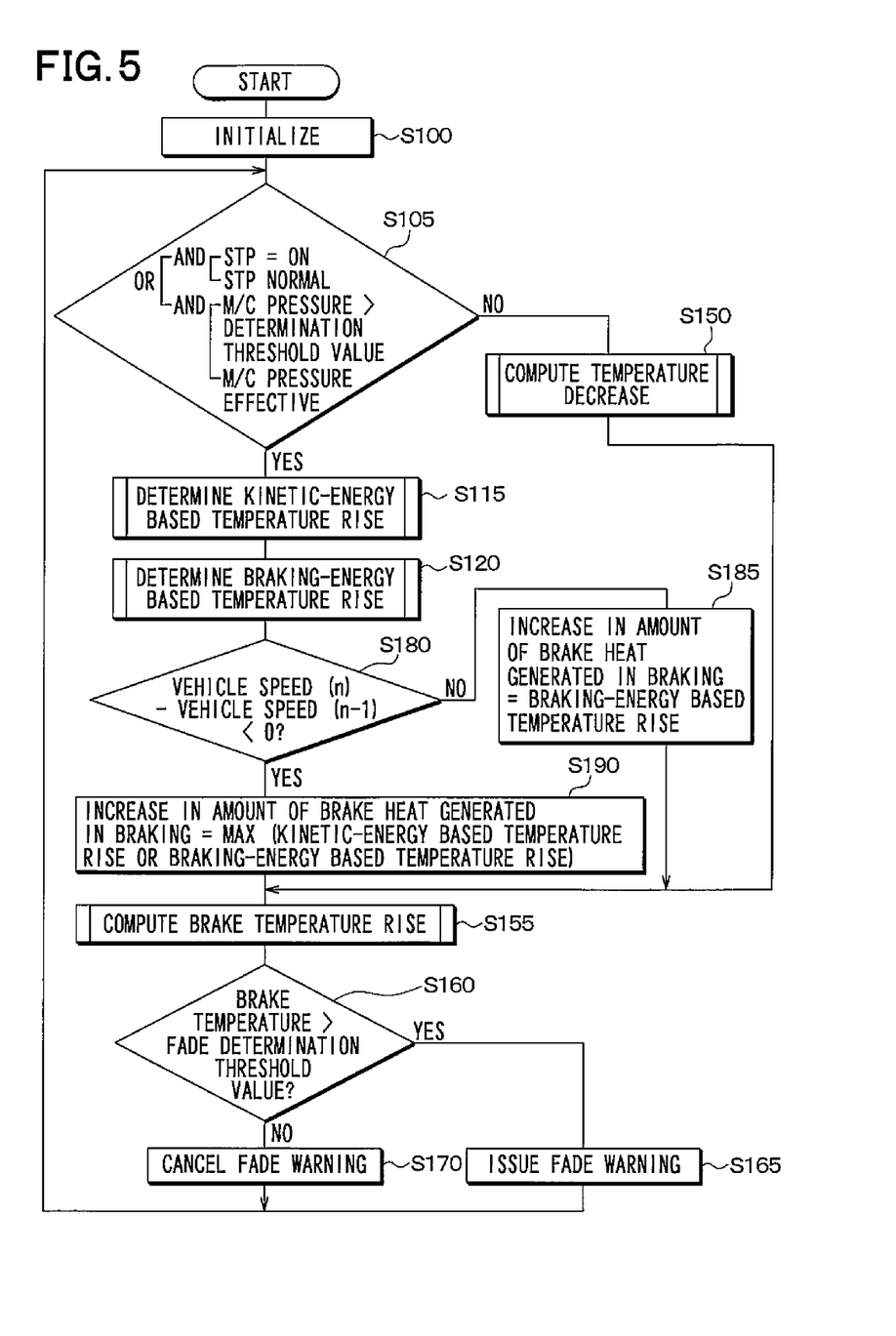
FIG. 5 is a flowchart illustrating in detail the fade warning process that is performed by an EPB-ECU included in the EPB control device according to a second embodiment of the present invention.

FIG. 5 is a flowchart illustrating in detail the fade warning process that is performed by the EPB-ECU 9 according to the second embodiment. This fade warning process differs in the hill determination process from the fade warning process according to the first embodiment, which is shown in FIG. 2.

Specifically, the hill determination process according to the second embodiment is executed by performing step 180 instead of step 110, which is shown in FIG. 2. More specifically, steps 100, 105, 115, and 120 of FIG. 5 are performed to execute the same process as executed in steps 100, 105, 115, and 120 of FIG. 2. Step 180 is performed to determine whether the difference between a vehicle speed (n) obtained during the current control cycle (nth control cycle) and the vehicle speed (n−1) obtained during the previous control cycle is a negative value.

If the vehicle speed is not lowered when the vehicle is being decelerated by braking, it is conceivable that the vehicle is running on a downwardly-sloped road surface, and that the intended deceleration is not achieved under the influence of gravitational acceleration. Therefore, if the query in step 180 is answered "NO", it is conceivable that the vehicle is running on a downwardly-sloped road surface, and that the influence of gravitational acceleration is great. Thus, processing proceeds to step 185 and selects the braking-energy based temperature rise as the increase in the amount of brake heat generated in braking. If, on the other hand, the query in step 180 is answered "YES", the vehicle may be safely considered to be running on a flat road surface because the influence of gravitational acceleration is small even if the vehicle is actually running on a flat, upwardly-sloped, or downwardly-sloped road surface. Processing then proceeds to step 190 and executes the same process as executed in step 140, which is described in conjunction with the fade warning process according to the first embodiment. Hence, the kinetic-energy based temperature rise or the braking-energy based temperature rise, whichever is smaller, is used as the increase in the amount of brake heat generated in braking. Thus, an upper-limit guard is set for the value of the braking-energy based temperature rise even when the vehicle is running on an upwardly-sloped road surface. Therefore, when the kinetic-energy based temperature rise is computed to be greater than its actual value, it is possible to prevent the kinetic-energy based temperature rise from being used as the increase in the amount of brake heat generated in braking.

Subsequently, steps 155 to 170 are performed to execute the same process as executed in steps 155 to 170 of FIG. 2. The fade warning process according to the second embodiment is now completed.

As described above, the hill determination process can be executed in accordance with changes in the vehicle speed. This makes it possible to execute the hill determination process without using the map indicative of the relationship between the M/C pressure and deceleration, which has been described in conjunction with the first embodiment.

Here, whether the vehicle is running on a downwardly-sloped road surface, which is significantly affected by gravitational acceleration, is determined by determining whether the difference between the vehicle speed (n) obtained during the current control cycle and the vehicle speed (n−1) obtained during the previous control cycle is a negative value. However, an alternative is to determine that the vehicle is running on a downwardly-sloped road surface when the difference between the vehicle speed (n) obtained during the current control cycle and the vehicle speed (n−1) obtained during the previous control cycle is a negative value, determine that the vehicle is running on a flat road surface when the difference is within a predetermined range, and determine that the vehicle is running on an upwardly-sloped road surface when the difference is greater than an upper-limit value within the predetermined range. When such an alternative scheme is adopted, steps 130, 140, and 145 of FIG. 2 should be performed for each of the flat, upwardly-sloped, and downwardly-sloped road surfaces to set the increase in the amount of brake heat generated in braking.

Third Embodiment

A third embodiment of the present invention will now be described. The third embodiment differs from the second embodiment in the hill determination process and in the method of setting the increase in the amount of brake heat generated in braking, and is the same as the second embodiment in the other respects. Therefore, the following description deals with only the differences between the third embodiment and the second embodiment.

Figure 6:
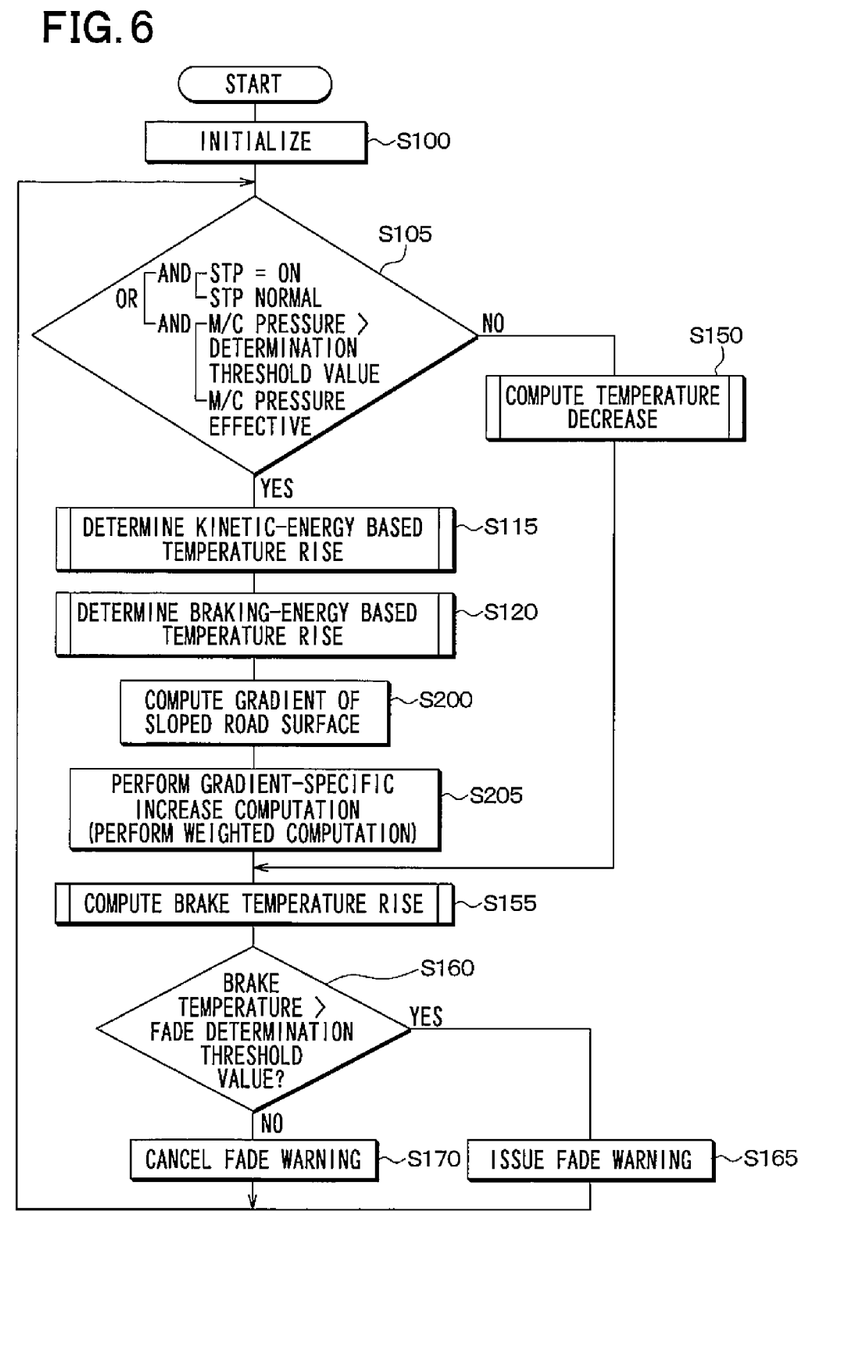
FIG. 6 is a flowchart illustrating in detail the fade warning process that is performed by the EPB-ECU included in the EPB control device according to a third embodiment of the present invention.

FIG. 6 is a flowchart illustrating in detail the fade warning process that is performed by the EPB-ECU 9 according to the third embodiment. The third embodiment computes the gradient of a road surface in the hill determination process and sets the increase in the amount of brake heat generated in braking in accordance with the gradient of the road surface.

First of all, steps 100, 105, 115, and 120 of FIG. 6 are performed to execute the same process as executed in steps 100, 105, 115, and 120 of FIG. 2. Next, the hill determination process is executed in step 200 to determine the type of the road surface (flat, upwardly-sloped, or downwardly-sloped road surface) by computing the gradient of the road surface. Processing then proceeds to step 205. In step 205, a gradient-specific increase computation process is performed in which the increase in the amount of brake heat generated in braking is calculated in a manner that changes depending on the gradient of the road surface. For instance, in the case that it is determined as indicated in FIG. 3 that the vehicle is running on a flat load, and in the case that the gradient of the road surface is small even in a situation where the it is determined that the vehicle is running on an upwardly-sloped, or downwardly-sloped road surface, a weighted computation is performed in accordance with the gradient to determine the increase in the amount of brake heat generated in braking on an individual gradient basis, i.e. in a manner that changes depending on the gradient of the road surface. When, for instance, the linear function of the reference deceleration, which indicates the relationship between the deceleration and the M/C pressure in the case that there is no variation, is used as a reference straight line, and the relationship between the deceleration and the M/C pressure prevailing during the current control cycle is on the reference straight line, the kinetic-energy based temperature rise is used as is as the increase in the amount of brake heat generated in braking.

If the relationship between the deceleration and the M/C pressure prevailing during the current control cycle is not on the reference straight line but is within a range within which the vehicle is determined to be running on a flat road surface, weighting is performed to set the increase in the amount of brake heat generated in braking in accordance with the deviation from the reference straight line, that is, in accordance with a position of the relation in a region from the reference straight line to the edge of an upwardly- or downwardly-sloped road surface region. In the weighted calculation, the increase in the amount of brake heat generated in braking Z is calculated in the equation $Z=(pX+qY)/(p+q)$ wherein X is the kinetic-energy based temperature, Y is the braking-energy based temperature rise and p and q are weight coefficients. For example, if the relationship between the deceleration and the M/C pressure prevailing during the current control cycle is positioned midway between the reference straight line and the upwardly- or downwardly-sloped road surface region, the increase in the amount of brake heat generated in braking is set by weighting the kinetic-energy based temperature rise and the braking-energy based temperature rise at a ratio of 5:5, i.e. $p=q=5$. If the deviation from the reference straight line increases, the increase in the amount of brake heat generated in braking is set by increasing the weight q on the braking-energy based temperature rise.

As described above, the increase in the amount of brake heat generated in braking can be set by weighting in accordance with the gradient of the road surface. This makes it possible to more accurately set the increase in the amount of brake heat generated in braking in accordance with the gradient of the road surface.

Other Embodiments

The present invention is not limited to the above-described embodiments. Various modifications can be made as needed without departing from the scope of the present invention.

For example, the foregoing embodiments have been described on the assumption that the brake temperature is detected to perform the fade warning process or that lock control is exercised in consideration of heat slack of the EPB 2. However, an alternative control scheme may be used, for instance, to drive the pumps and control valves included in the actuator 7 to raise the W/C pressure in consideration of the effect of the brake, which varies with the brake temperature, when the service brake is operated under normal conditions.

Further, the foregoing embodiments have been described on the assumption that the employed EPB 2 is of a disc brake type and provided with the brake pad 11, which serves as a friction material, and the brake disc 12, which serves as a friction target material. However, an alternative is to use a different type of EPB, such as a drum brake type EPB. When such an alternative is adopted, a brake shoe is used as a friction material while a drum is used as a friction target material.

The steps depicted in various figures correspond to means for executing various processes. More specifically, a means for executing the process described in step 115 is a first acquisition means; a means for executing the process described in step 120 is a second acquisition means; a means for executing the process described in steps 125, 135, 180, and 200 is a hill determination means; and a means for executing the process described in step 155 is a temperature detection means.

In the above embodiment, the amount of heat and the amount of brake heat have a dimension of temperature. However, they may have a dimension of energy in another embodiment.

The invention claimed is:

1. An electric parking brake control device which includes a brake temperature detection device which detects a brake temperature based on a selected temperature rise, comprising:
   a first acquisition means that acquires a kinetic-energy based temperature rise, which is a temperature reading increase calculated based on an increase in an amount of brake heat that occurs when kinetic energy generated in a running vehicle is converted into thermal energy by braking;
   a second acquisition means that acquires a braking-energy based temperature rise, which is a temperature reading increase calculated based on an increase in an amount of brake heat that is calculated from an amount of work done when a brake's friction material is pressed against a friction target material; and
   a hill determination means that determines state of slope of a road surface on which the vehicle is running,
   wherein the brake temperature detection device selects the kinetic-energy based temperature rise as the selected temperature rise when the hill determination means determines that the road surface on which the vehicle is running is a flat road surface, and selects the kinetic-energy based temperature rise or the braking-energy based temperature rise, whichever is smaller, as the selected temperature rise when the hill determination means determines that the road surface on which the vehicle is running is an upwardly-sloped road surface, and
   wherein the electric parking brake control device controls generation of a braking force by an electric parking brake in accordance with the brake temperature previously detected by the brake temperature detection device.

2. The electric parking brake control device according to claim 1, wherein:
   the electric parking brake drives a motor to generate a pressing force for pressing a friction material against a friction target material and generates the braking force by causing friction between the friction material and the friction target material,
   the electric parking brake control device further comprises a lock control means that executes lock control by driving the motor to generate the pressing force and let the electric parking brake generate the braking force, stopping the drive of the motor when the braking force reaches a target braking force, and maintaining the braking force to achieve a locked state, and
   the lock control means sets a timing of ending the lock control in accordance with the brake temperature previously detected by the brake temperature detection device.

3. An electric parking brake control device which includes a brake temperature detection device which detects a brake temperature based on a selected temperature rise, comprising:
   a first acquisition means that acquires a kinetic-energy based temperature rise, which is a temperature reading increase calculated based on an increase in an amount of brake heat that occurs when kinetic energy generated in a running vehicle is converted into thermal energy by braking;
   a second acquisition means that acquires a braking-energy based temperature rise, which is a temperature reading increase calculated based on an increase in an amount of brake heat that is calculated from an amount of work done when a brake's friction material is pressed against a friction target material; and
   a hill determination means that determines state of slope of a road surface on which the vehicle is running,
   wherein the brake temperature detection device selects the kinetic-energy based temperature rise as the selected temperature rise when the hill determination means determines that the vehicle is running on a flat road surface, and selects the kinetic-energy based temperature rise or the braking-energy based temperature rise, whichever is greater, as the selected temperature rise when the hill determination means determines that the vehicle is running on a downwardly-sloped road surface, and
   wherein the electric parking brake control device controls generation of a braking force by an electric parking brake in accordance with the brake temperature previously detected by the brake temperature detection device.

4. The electric parking brake control device according to claim 3, wherein:

the electric parking brake drives a motor to generate a pressing force for pressing a friction material against a friction target material and generates the braking force by causing friction between the friction material and the friction target material, the electric parking brake control device further comprises a lock control means that executes lock control by driving the motor to generate the pressing force and let the electric parking brake generate the braking force, stopping the drive of the motor when the braking force reaches a target braking force, and maintaining the braking force to achieve a locked state, and the lock control means sets a timing of ending the lock control in accordance with the brake temperature previously detected by the brake temperature detection device.

* * * * *